(12) United States Patent
Fan et al.

(10) Patent No.: US 12,461,774 B2
(45) Date of Patent: Nov. 4, 2025

(54) ELECTRONIC DEVICE CAPABLE OF PERFORMING MULTI-CAMERA INTELLIGENT SWITCHING AND MULTI-CAMERA INTELLIGENT SWITCHING METHOD THEREOF

(71) Applicant: Acer Incorporated, New Taipei (TW)

(72) Inventors: Sheng-Hsin Fan, New Taipei (TW); Chao-Kuang Yang, New Taipei (TW); Liang-Chi Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 113 days.

(21) Appl. No.: 18/525,312

(22) Filed: Nov. 30, 2023

(65) Prior Publication Data

US 2024/0184615 A1 Jun. 6, 2024

(30) Foreign Application Priority Data

Dec. 6, 2022 (TW) .................................. 111146762

(51) Int. Cl.
*G06F 9/46* (2006.01)
*G06F 9/54* (2006.01)
*H04N 23/90* (2023.01)

(52) U.S. Cl.
CPC .............. *G06F 9/462* (2013.01); *G06F 9/542* (2013.01); *H04N 23/90* (2023.01)

(58) Field of Classification Search
CPC .......... G06F 9/462; G06F 9/542; H04N 23/90
See application file for complete search history.

(56) References Cited

U.S. PATENT DOCUMENTS

| | | | |
|---|---|---|---|
| 9,398,258 B1 * | 7/2016 | Sandvik | H04N 7/15 |
| 9,491,374 B1 * | 11/2016 | Avrahami | G06V 40/20 |
| 9,798,933 B1 * | 10/2017 | Meisser | H04N 23/90 |
| 9,967,418 B1 * | 5/2018 | Kanumuri | H04N 1/00938 |
| 10,531,039 B1 * | 1/2020 | Bender | H04N 7/142 |
| 10,771,741 B1 * | 9/2020 | Reynolds | H04N 7/15 |
| 2008/0018946 A1 * | 1/2008 | Higuchi | H04N 1/3871 358/400 |
| 2009/0323818 A1 * | 12/2009 | Weiss | H04N 21/8173 375/240.18 |
| 2011/0249086 A1 * | 10/2011 | Guo | H04N 23/617 348/E7.083 |

(Continued)

FOREIGN PATENT DOCUMENTS

CN 114257831 A 3/2022

*Primary Examiner* — Timothy R Newlin
(74) *Attorney, Agent, or Firm* — Birch, Stewart, Kolasch & Birch, LLP (57) ABSTRACT

An electronic device capable of performing multi-camera intelligent switching and a multi-camera intelligent switching method thereof are provided. The electronic device includes a plurality of camera device media foundation transform (camara DMFT) units, an integrated DMFT unit and a mix camera agent. Each of the camera DMFT units is connected to one of a plurality of cameras. The integrated DMFT unit is serially connected to one of the camera DMFT units. The mix camera agent is connected to the cameras. The mix camera agent is used for obtaining a switching notification signal. The integrated DMFT unit switches a serial path between the integrated DMFT unit and one of the camera DMFT units according to the switching notification signal.

20 Claims, 7 Drawing Sheets (56) References Cited

U.S. PATENT DOCUMENTS

| | | | |
|---|---|---|---|
| 2013/0050581 A1* | 2/2013 | Deshpande | H04N 5/265 348/E5.057 |
| 2014/0192207 A1* | 7/2014 | Ji | H04N 9/646 348/184 |
| 2014/0244715 A1* | 8/2014 | Hodges | H04L 67/75 709/203 |
| 2015/0237356 A1* | 8/2015 | Wu | H04N 19/174 375/240.03 |
| 2016/0210159 A1* | 7/2016 | Wilson | G06F 9/44505 |
| 2016/0286120 A1* | 9/2016 | Kuo | H04N 23/63 |
| 2017/0094189 A1* | 3/2017 | Ogawa | H04N 23/667 |
| 2017/0163880 A1* | 6/2017 | Oshima | H04N 5/2621 |
| 2018/0124270 A1* | 5/2018 | Kanumuri | H04N 23/60 |
| 2021/0365271 A1* | 11/2021 | Dsouza | G06F 9/547 |
| 2022/0108431 A1* | 4/2022 | Baran | G06N 3/0455 |
| 2022/0232189 A1* | 7/2022 | Swierk | G06T 7/90 |
| 2023/0085042 A1* | 3/2023 | Dhanda | H04N 23/45 348/222.1 |
| 2023/0216900 A1* | 7/2023 | Kuenzi | H04L 65/1089 709/204 |
| 2023/0251875 A1* | 8/2023 | Nishiyama | G06F 9/44505 713/100 |
| 2023/0396826 A1* | 12/2023 | Apurvi | H04N 21/2187 |
| 2024/0040067 A1* | 2/2024 | Apurvi | H04N 21/2187 |
| 2024/0062502 A1* | 2/2024 | Paz | G06T 11/00 |
| 2024/0098285 A1* | 3/2024 | Orton-Jay | H04N 21/234327 |

\* cited by examiner

ELECTRONIC DEVICE CAPABLE OF PERFORMING MULTI-CAMERA INTELLIGENT SWITCHING AND MULTI-CAMERA INTELLIGENT SWITCHING METHOD THEREOF

This application claims the benefit of Taiwan application Serial No. 111146762, filed Dec. 6, 2022, the subject matter of which is incorporated herein by reference.

BACKGROUND OF THE INVENTION

Field of the Invention

The invention relates in general to an electronic device and a control method thereof, and more particularly to an electronic device capable of performing multi-camera intelligent switching and a multi-camera intelligent switching method thereof.

Description of the Related Art

Along with the development of digital transformation trends, it has become more and more popular for people to communicate by way of live broadcasting, image, and video. In such communication mode, cameras play a significant role. In various communication modes, if the camera is fixed and is unique, the performance of communication will be greatly reduced. Therefore, the application of multiple cameras has become more and more popular.

When a camera application such as presentation/video conferencing/live broadcasting is performed, it is not easy for the user to find the desired camera setting page for switching cameras. Moreover, during presentation/video conferencing/live broadcasting, the user cannot easily switch the frame of presentation/video conferencing/live broadcasting to the desired camera setting page.

Besides, each camera has a corresponding device name, and it is not easy for the user to recognize the corresponding relationship between the cameras and corresponding device names. In order to interact with the speaker or environment during presentation/video conferencing/live broadcasting, the user needs to walk around and therefore cannot timely switch the cameras. Consequently, the quality of presentation/video conferencing/live broadcasting will be affected. Despite the operating system of the electronic device having various in-built special effects processing functions for cameras, the user who is performing a presentation/video conferencing/live broadcasting is unable to easily switch the frame of presentation/video conferencing/live broadcasting to the special effects setting page.

Therefore, the user needs to set suitable cameras before the presentation/video conferencing/live broadcasting begins and is unable to smoothly perform switching during presentation/video conferencing/live broadcasting. Under such circumstance, the application of multiple cameras still cannot produce the maximum effect.

SUMMARY OF THE INVENTION

The invention is directed to an electronic device capable of performing multi-camera intelligent switching and a multi-camera intelligent switching method thereof. Through the control interface provided by the mix camera agent, the user can freely switch cameras on the frame of presentation/video conferencing/live broadcasting. Moreover, the user can use the integrated DMFT unit to serially connect a desired camera DMFT unit then serially connects the image of the selected camera to a camera application directly.

According to one embodiment of the present invention, an electronic device capable of performing multi-camera intelligent switching is provided. The electronic device includes a plurality of camera device media foundation transform (camara DMFT) units, an integrated DMFT unit and a mix camera agent. Each of the camera DMFT units is connected to one of a plurality of cameras. The integrated DMFT unit is serially connected to one of the camera DMFT units. The mix camera agent is connected to the cameras. The mix camera agent is used for obtaining a switching notification signal. The integrated DMFT unit switches a serial path between the integrated DMFT unit and one of the camera DMFT units according to the switching notification signal.

According to another embodiment of the present invention, a multi-camera intelligent switching method is provided. The multi-camera intelligent switching method includes the following steps. A camera application is activated. A switching notification signal is obtained by a mix camera agent. The switching notification signal is transmitted to an integrated device media foundation transform (integrated DMFT) unit. A serial path between the integrated DMFT unit and one of the camara DMFT units is switched by the integrated DMFT unit according to the switching notification signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
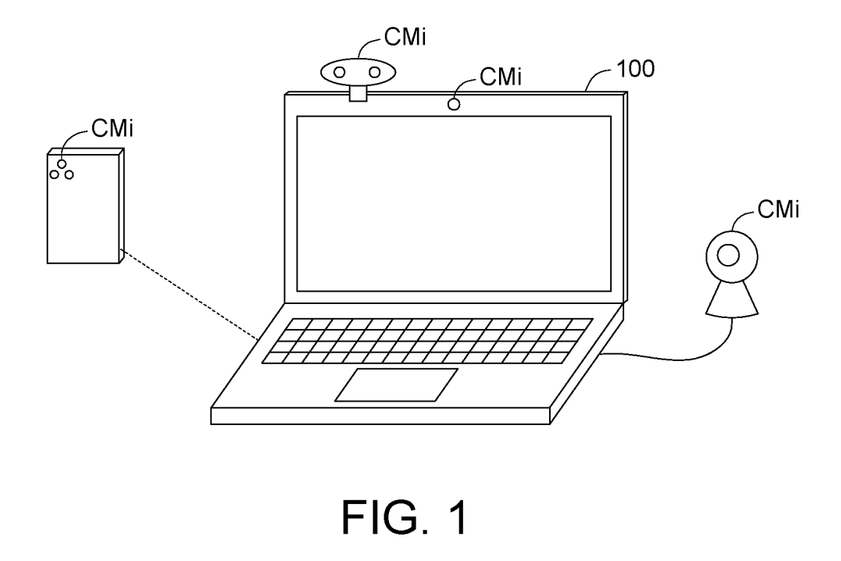
FIG. 1 is a schematic diagram of an electronic device according to an embodiment.

Referring to FIG. 1, a schematic diagram of an electronic device 100 according to an embodiment is shown. The electronic device 100 of the present embodiment can be realized by such as a laptop, a desktop, a tablet or a smartphone. The electronic device 100 may have a plurality of in-built or external cameras CMi. Conventionally, the cameras can be switched through cameras setting page. However, the user must set suitable cameras CMi before presentation/video conferencing/live broadcasting begins and cannot smoothly switch the cameras during the process of the presentation/video conferencing/live broadcasting. In the present embodiment, a brand-new architecture of the application layer and the media foundation layer capable of allowing the user to more conveniently and intuitively switch the cameras CMi is provided.

Figure 2:
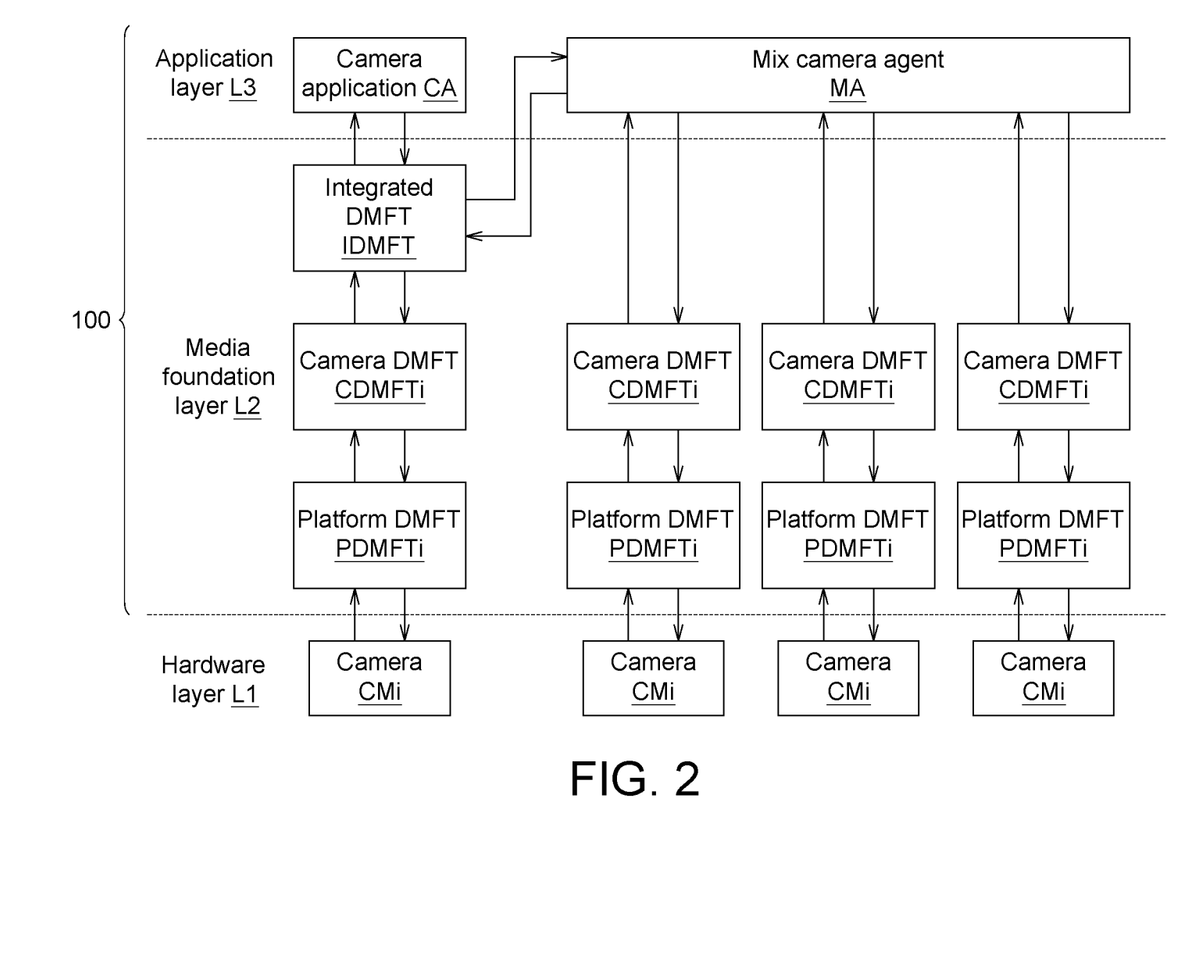
FIG. 2 is a schematic diagram of an electronic device according to an embodiment.

Referring to FIG. 2, a schematic diagram of an electronic device 100 according to an embodiment is shown. The electronic device 100 includes a plurality of platform device media foundation transform (platform DMFT) units PDMFTi, a plurality of camara DMFT units CDMFTi, an integrated DMFT unit IDMFT, a mix camera agent MA and a plurality of camera applications CA. The platform DMFT units PDMFTi are respectively connected to corresponding cameras CMi. The cameras CMi are disposed on a hardware layer L1. The platform DMFT units PDMFTi, the camera DMFT units CDMFTi and the integrated DMFT unit IDMFT are disposed on a media foundation layer L2. The mix camera agent MA and the camera application CA are disposed on an application layer L3.

The camera CMi can be realized by such as the in-built front/rear camera of the electronic device 100, an external camera, or the camera of a mobile phone linked to the electronic device 100.

The platform DMFT unit PDMFTi can be realized by such as the in-built driver, driver firmware or driver circuit of an operating system, and is disposed on the first one of the media foundation pipelines.

The camera DMFT unit CDMFTi can be realized by such as the driver, driver firmware or driver circuit provided by independent hardware vendor (IHV) of each camera CMi.

The integrated DMFT unit IDMFT is disposed on the last one of the media foundation pipelines and is used for integrating all camera DMFT units CDMFTi. The integrated DMFT unit IDMFT receives notification from the mix camera agent MA to serially connect all camera DMFT units CDMFTi in use. The integrated DMFT unit IDMFT can only be serially connected to one camera DMFT unit CDMFTi in each time.

The mix camera agent MA is used for providing a control interface and an on-screen display. The user can directly select a desired camera CMi through the control interface of the mix camera agent MA.

The camera application CA can be realized by such as video conferencing application software, live broadcasting software, or social software.

In the present embodiment, the user can freely switch the cameras CMi on the presentation/video conferencing/live screen through the control interface provided by the mix camera agent MA. Furthermore, the user can use the integrated DMFT unit IDMFT to serially connect a desired camera DMFT unit CDMFTi then serially connects the images of the selected camera CMi to the camera application CA directly.

Figure 3:
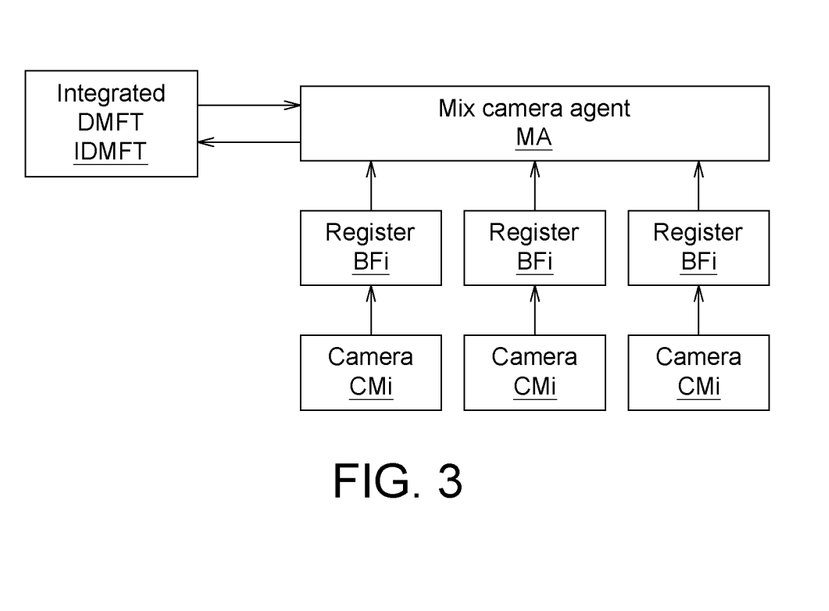
FIG. 3 is a schematic diagram of the electronic device further including a plurality of registers.

Refer to FIG. 3. The electronic device 100 further includes a plurality of registers BFi. Each of the registers BFi is connected between the mix camera agent MA and a corresponding camera CMi. Each of the registers BFi is used for temporarily storing the camera frame of the corresponding camera CMi. When the serial path is switched, the integrated DMFT unit IDMFT can quickly obtain the camera frame of other cameras CMi. In the part of the media foundation layer L2 (illustrated in FIG. 2), the integrated DMFT unit IDMFT integrates the camera DMFT units CDMFTi of the primary cameras CMi and the platform DMFT units PDMFTi through CameraDeviceMftCLSID-Chain. The CameraDeviceMftCLSIDChain is composed of the class ID (CLSID) of the integrated DMFT unit IDMFT, the camera DMFT units CDMFTi and the platform DMFT units PDMFTi. The operations of each of the above elements are disclosed below with an accompany flowchart.

Figure 4:
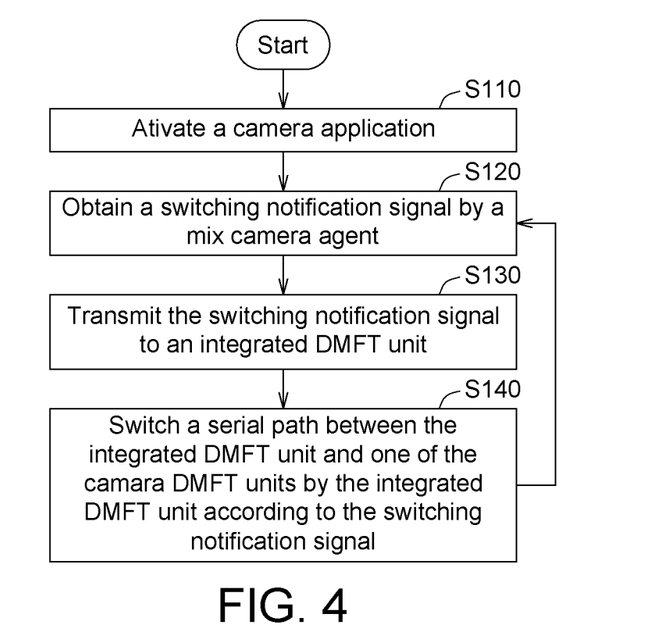
FIG. 4 is a flowchart of a multi-camera intelligent switching method according to an embodiment.
Figure 5:
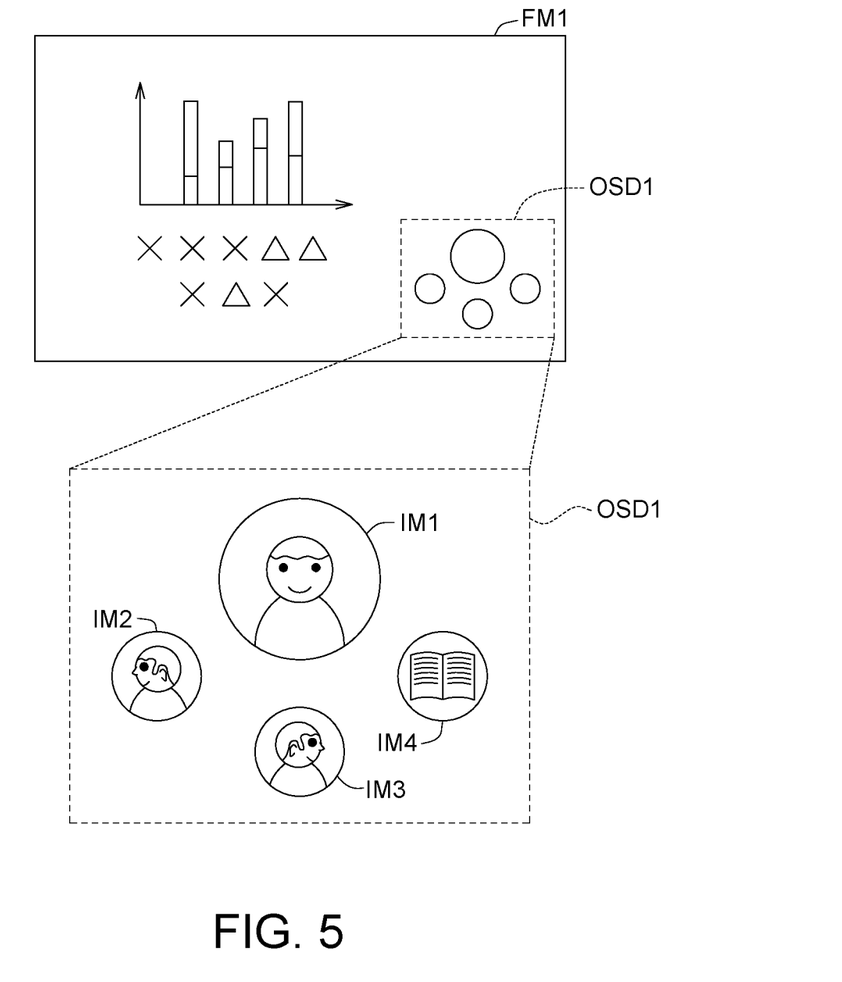
FIGS. 5 to 7 illustrate each step of FIG. 4.
Figure 6:
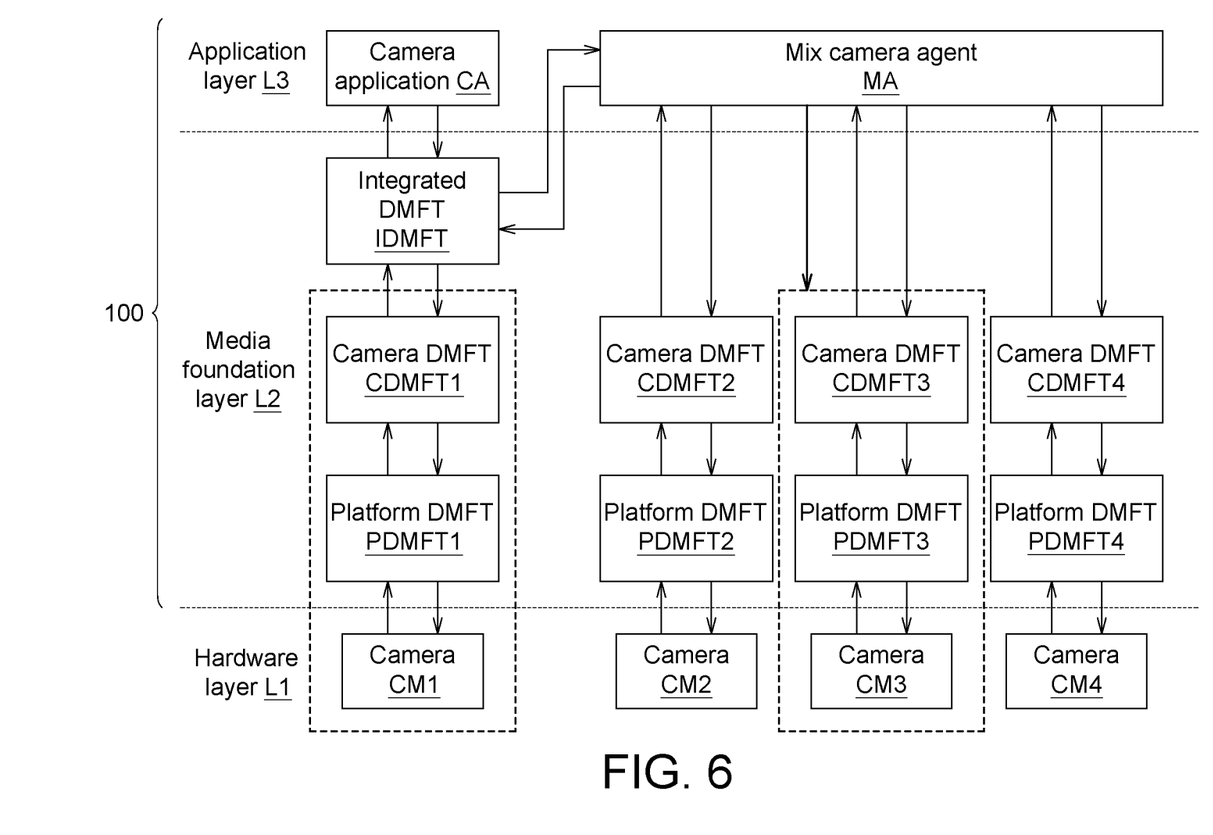
Figure 7:
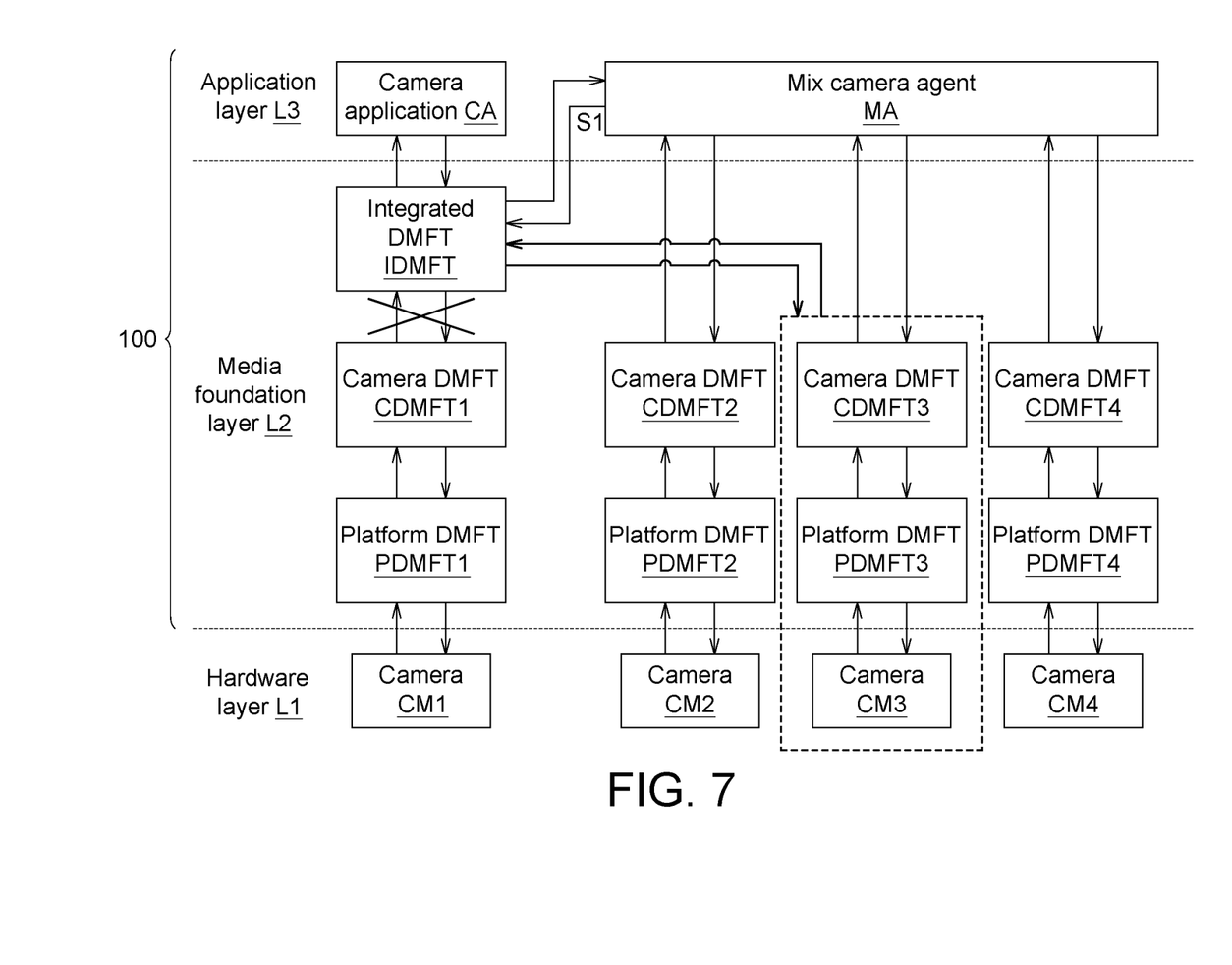

Refer to FIGS. 4 to 6. FIG. 4 is a flowchart of a multi-camera intelligent switching method according to an embodiment. FIGS. 5 to 7 illustrate each step of FIG. 4. In step S110, a camera application CA is activated. For instance, the user can activate a video function in the video conferencing application software, live broadcasting software or social software. The video function can be in-built in the front camera of the electronic device 100. As indicated in FIG. 5, when the camera application CA displays an application frame FM1, the control interface OSD1 provided by the mix camera agent MA is superimposed on the screen. The control interface OSD1 is not provided by the camera application CA; it is superimposed on the application frame FM1. In an embodiment, the control interface OSD1 can be moved when necessary. During presentation, the user does not project the control interface OSD1 onto other electronic devices; the control interface OSD1 can only be displayed on the user's electronic device 100.

As indicated in FIG. 5, all cameras CM1 to CM4 are activated. The control interface OSD1 only display camera frames IM1 to IM4 respectively captured by the cameras CM1 to CM4. The camera CM1 faces the front of the screen; the camera CM2 faces rightward from the left of the electronic device 100; the camera CM3 faces leftwards from the right of the electronic device 100; the cameras CM4 faces the desktop. In the control interface OSD1, the camera frame IM1, being the largest camera frame, is the current camera frame transmitted to other electronic devices, and the remaining camera frames IM2 to IM4 are switchable. Besides the camera frame IM1, the user can directly see other camera frames IM2 to IM4 then performs switching when necessary.

As indicated in FIG. 6, the integrated DMFT unit IDMFT serially connects the camera DMFT unit CDMFT1, the platform DMFT unit PDMFT1 and the camera CM1 in advance.

Next, the method proceeds to step S120, as indicated in FIG. 7, a switching notification signal S1 is obtained by the mix camera agent MA. The user can click the camera frame IM3 on the control interface OSD1 and the switching notification signal S1 will be generated.

Then, the method proceeds to step S130, as indicated in FIG. 7, the switching notification signal S1 is transmitted to the integrated DMFT unit IDMFT by the mix camera agent MA.

Then, the method proceeds to step S140, a serial path between the integrated DMFT unit IDMFT and one of the camera DMFT units CDMFTi is switched by the integrated DMFT unit IDMFT according to the switching notification signal S1. As indicated in FIG. 7, the integrated DMFT unit IDMFT is switched to the serial path of the camera DMFT unit CDMFT3 according to the switching notification signal S1. During steps S120 to S130, the user does not need to leave the application frame FM1 to reach any camera setting page. In fact, there is no need to change the camera setting page. The integrated DMFT unit IDMFT provided in the present embodiment can directly perform the switching of the camera CMi. For the electronic device 100, the electronic device 100 still corresponds to the same integrated DMFT unit IDMFT.

If the user needs to switch the camera CMi again, the user only needs to repeat the above steps S120 to S140.

Figure 8:
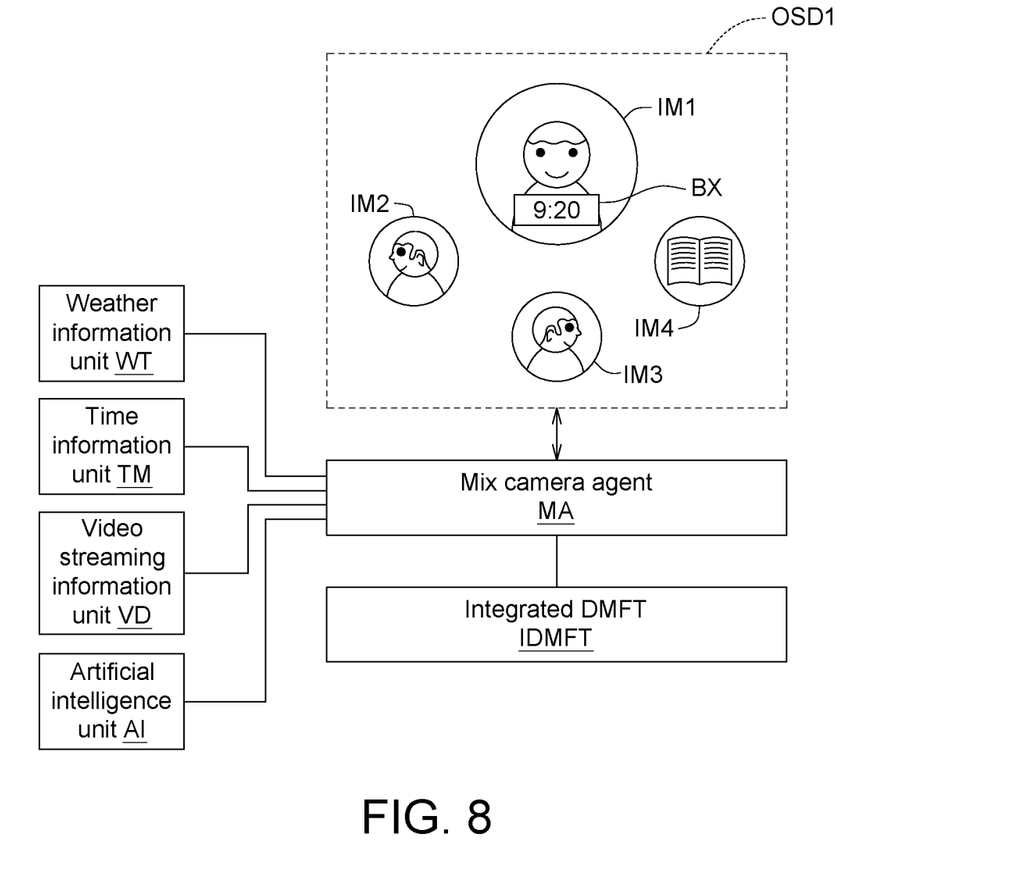
FIG. 8 illustrates further application of a mix camera agent.

Referring to FIG. 8, further application of the mix camera agent MA is illustrated. The mix camera agent MA can be connected to a weather information unit WT, a time information unit TM, a video streaming information unit VD or an artificial intelligence unit AI. For instance, the weather information unit WT can obtain local weather information through a network; the time information unit TM can obtain time information through a network or an internal timer of the electronic device 100; the video streaming information unit VD can obtain a streaming video through a network; the artificial intelligence unit AI provides information analysis after performing object/portrait recognition. The mix camera agent MA can obtain various information from the weather information unit WT, the time information unit TM, the video streaming information unit VD or the artificial intelligence unit AI, then display the obtained information on an info box BX of the control interface OSD1 provided by the mix camera agent MA. Similarly, the control interface OSD1 can only be displayed on the user's electronic device 100 and will not be projected onto other electronic devices.

According to the above embodiments, through the control interface OSD1 provided by the mix camera agent MA, the user can freely switch camera CMi during presentation/video conferencing/live screen. Moreover, the integrated DMFT unit IDMFT can serially connect a desired camera DMFT unit CDMFTi then serially connects the image of the selected camera CMi to the camera application CA directly.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An electronic device capable of performing multi-camera intelligent switching, comprising:
   a plurality of camera device media foundation transform (camera DMFT) units, wherein each of the camera DMFT units is connected to one of a plurality of cameras;
   an integrated DMFT unit, serially connected to one of the camera DMFT units; and
   a mix camera agent, connected to the plurality of cameras and used for obtaining a switching notification signal;
   wherein the integrated DMFT unit switches a serial path between the integrated DMFT unit and one of the camera DMFT units according to the switching notification signal.

2. The electronic device according to claim 1, wherein the mix camera agent provides a control interface to obtain the switching notification signal.

3. The electronic device according to claim 1, wherein the control interface is superimposed on an application frame of a camera application.

4. The electronic device according to claim 1, wherein the mix camera agent provides a camera frame of each of the plurality of cameras.

5. The electronic device according to claim 1, further comprising:
   a plurality of registers, connected between the mix camera agent and the plurality of cameras, wherein each of the plurality of registers temporally stores a camera frame of each of the plurality of cameras.

6. The electronic device according to claim 5, wherein when the serial path is switched, the integrated DMFT unit obtains the camera frame from each of the plurality of registers.

7. The electronic device according to claim 1, wherein the mix camera agent provides an info box.

8. The electronic device according to claim 1, wherein the mix camera agent provides an on-screen display.

9. The electronic device according to claim 1, wherein the integrated DMFT unit is only serially connected to one of the camera DMFT units in each time.

10. The electronic device according to claim 1, wherein all of the plurality of cameras are activated.

11. A multi-camera intelligent switching method, comprising:
    activating a camera application;
    obtaining a switching notification signal by a mix camera agent;
    transmitting the switching notification signal to an integrated device media foundation transform (integrated DMFT) unit; and
    switching a serial path between the integrated DMFT unit and one of a plurality of camera DMFT units by the integrated DMFT unit according to the switching notification signal.

12. The multi-camera intelligent switching method according to claim 11, wherein the mix camera agent provides a control interface to obtain the switching notification signal.

13. The multi-camera intelligent switching method according to claim 11, wherein the control interface is superimposed on an application frame of a camera application.

14. The multi-camera intelligent switching method according to claim 11, wherein the mix camera agent provides a camera frame of each of a plurality of cameras.

15. The multi-camera intelligent switching method according to claim 11, wherein a camera frame of each of a plurality of cameras is temporarily stored in one of a plurality of registers.

16. The multi-camera intelligent switching method according to claim 15, wherein when the serial path is switched, the integrated DMFT unit obtains the camera frame from each of the plurality of registers.

17. The multi-camera intelligent switching method according to claim 11, wherein the mix camera agent provides an info box.

18. The multi-camera intelligent switching method according to claim 11, wherein the mix camera agent provides an on-screen display.

19. The multi-camera intelligent switching method according to claim 11, wherein the integrated DMFT unit is only serially connected to one of the camera DMFT units in each time.

20. The multi-camera intelligent switching method according to claim 11, wherein all of a plurality of cameras are activated.

* * * * *